No. 646,335. Patented Mar. 27, 1900.
C. WETHERWAX.
PROCESS OF TREATING GOLD ORES.
(Application filed Jan. 19, 1898.)
(No Model.)
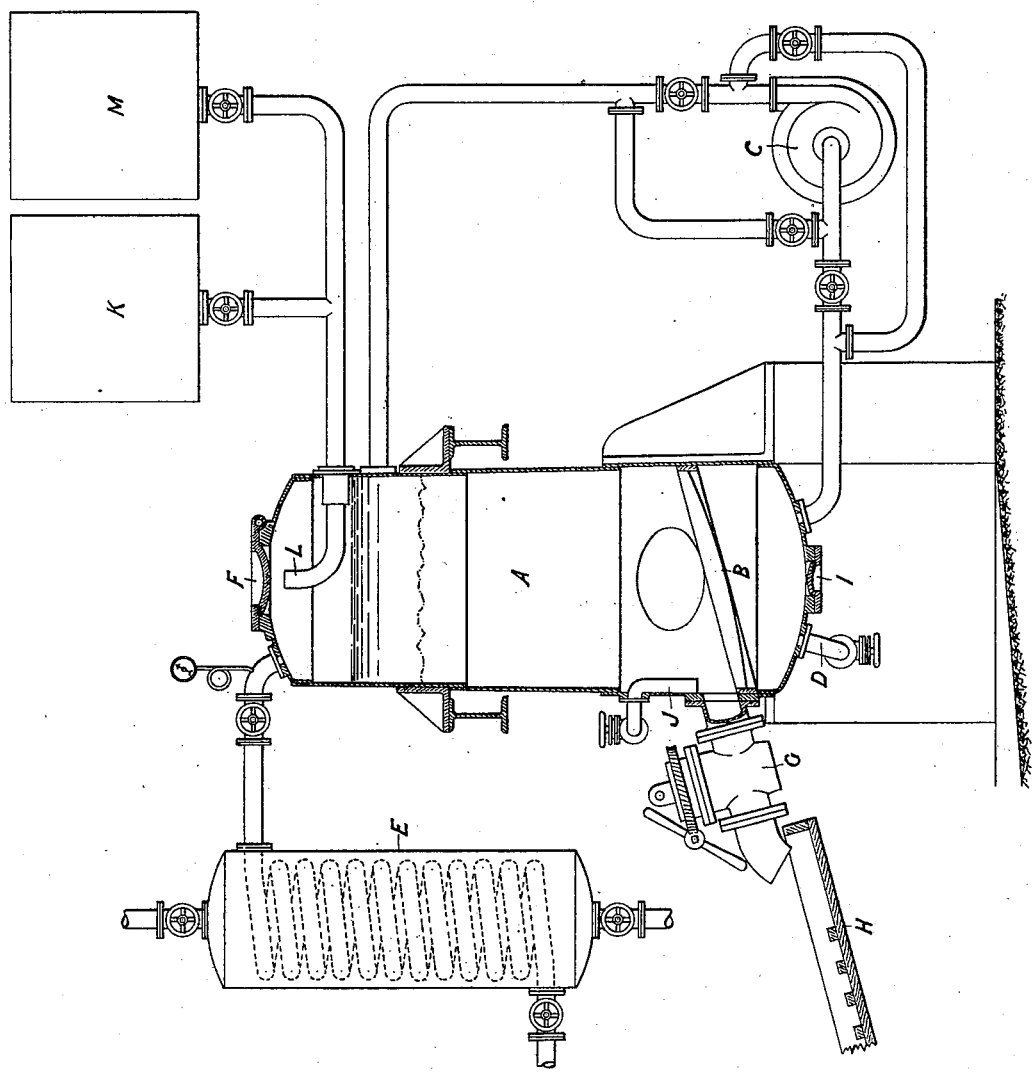

UNITED STATES PATENT OFFICE.

CHARLES WETHERWAX, OF BEST, NEW YORK.

PROCESS OF TREATING GOLD ORES.

SPECIFICATION forming part of Letters Patent No. 646,335, dated March 27, 1900.

Application filed January 19, 1898. Serial No. 667,166. (No specimens.)

*To all whom it may concern:*

Be it known that I, CHARLES WETHERWAX, manufacturer, of Best, Rensselaer county, in the State of New York, have invented a new and useful Improved Process of Treating Gold Ores, of which the following is a full, clear, and exact description.

My invention relates to the preliminary treatment of gold ores, more particularly refractory gold ores, with a view to more completely liberating the gold from its combination or association with other elements or compounds which render the ore difficult of treatment by the usual reagents, and so preparing the ore for recovery of the gold therefrom by usual means.

The invention consists, essentially, in digesting the ore under steam-pressure in a solution of water-glass, preferably with the addition of caustic soda or caustic potash. The average proportions of the reagents and the strength of the solution which may be employed are, say, eight ounces of sodium or potassium silicate in solution and eight ounces of sodium or potassium hydroxid to the gallon of water. These proportions are, however, susceptible of variation according to the nature and condition of the ore, allowance being made in the strength of the solution when treating ore in a wet state for the dilution of the solution by the contained moisture. The quantity of solution used should be sufficient to cover the ore, the whole being submitted to digestion under a steam-pressure of eighty pounds, more or less, to the square inch for an hour, more or less, the duration of the operation necessarily depending on the nature and condition of the auriferous mineral treated and on the amount of the steam-pressure employed, the period generally varying inversely as the amount of the pressure.

The operation may be performed in an apparatus such as that illustrated in the accompanying drawing, wherein A is the digester, provided with an inclined grid or apertured false bottom B and connected with a centrifugal pump C by a system of circulation-pipes, the pipes being preferably connected with the digester below the grid B and at a point above the level of the charge of ore, but below the level of the supernatant solution, the pipes connected with the suction and delivery of the pump being so controlled by stop-cocks that a circulation of the leaching solution may be maintained either in the upward or the downward direction through the mass of ore contained in the digester.

To the bottom of the digester is connected a pipe D, by which live steam at a pressure of, say, eighty pounds, more or less, may be introduced below the false bottom B, so as by passing up through the charge of ore to cause a circulation of the leaching solution and bring it into intimate contact with the ore.

E is a condenser with which the upper part of the digester is connected.

The digester and its contents may be heated by an internal steam-coil or by an external steam-jacket (which are not shown, but will be readily understood) to prevent excessive weakening of the solution by the condensation of the steam injected therein.

The digester is provided at top with a manhole F for charging in the ore and with a valve G, just above the lower part of the inclined grid B, for discharging the contents of the digester into a sluice H, provided with ripples and other usual means of intercepting the gold.

J is a nozzle whence a jet of steam may be directed toward the aperture G to facilitate the discharge of the solid matters, and I is a manhole in the bottom of the digester for cleaning out the chamber below the grid B.

The solution of water-glass and caustic alkali may be contained in a tank K, whence a pipe leads into the upper part of the digester and terminates in a nozzle L. M is a water-tank, also connected with the same nozzle, the connection in each case being controlled by stop-cocks. The nozzle L is upwardly directed in order that the jet may be directed against the top of the digester, so as to be evenly distributed over the contents.

The operation is performed as follows: The necessary quantity of solution to cover the charge of ore is first admitted into the digester from the tank K, and then the charge of ore is introduced and the digester closed. If the digester is provided with a steam coil or jacket, the contents are heated, and then steam is admitted by pipe D and the contents submitted to digestion for an hour, more or less. The solution may be meanwhile circulated by the pump, although such forced circulation is not indispensable when steam is injected below the grid B. The circulation would generally be in the upward direction when finely-crushed ore is treated and in the downward direction only when the ore is in coarse lumps. When the operation is complete, connection is opened with the condenser E in order to discharge and condense the fumes or obnoxious gases evolved, and then the valve G is opened and the contents discharged onto the sluice H, the discharge being assisted by the steam-jet at J and by water from the tank M to wash out the digester and carry the solid matters over the sluice.

Instead of steam being injected it may be generated in the digester, which would in that case be externally fired and may be placed in a vertical or horizontal position.

My process is applicable particularly to ores known under the name of "rusty gold," also to such ores in which the mineral or gangue can be broken by the expansion caused by heat and steam-pressure. The chemical solution is in such cases enabled to reach the gold particles, clean them, and render them "free gold." Expansion due to heat is much greater when the particles are confined in the presence of steam than under any other conditions.

My invention therefore is an improvement in that class of gold-treating processes in which a dissolution or removal of the substances incasing the grains of gold is aimed at. The action of water-glass as a solvent may be explained by the fact that water-glass is made from the very same sharp silicate which is contained in the gold quartz. The addition of a caustic alkali facilitates the removal of the gangue. The chemical reaction of course varies according to the constitution of the ore.

The solvent action of water-glass for quartz under high pressure is considerably more energetic and of a different character from that described in text-books.

I do not claim that water-glass under the conditions stated will dissolve all the stone and leave only the gold; but pyrites contain a great deal of what is called "rusty gold," which by my process is released, producing free gold. Such rusty gold cannot be recovered by amalgamation or any other usual process except incineration. I desire it to be understood that the ore to be treated according to my process is first crushed. I find that water-glass under high heat and pressure dissolves the material which holds the particles of quartz together without dissolving these particles themselves.

Having now particularly described and ascertained the nature of the said invention and in what manner the same is to be performed, I declare that what I claim is—

1. In the treatment of gold ores for liberating the gold from its combination or association with other elements or compounds, the process which consists in digesting the ore under steam-pressure in a solution containing water-glass (sodium or potassium silicate) as specified.

2. The process of treating gold ores, which consists in digesting the ore under steam-pressure in a solution containing water-glass (sodium or potassium silicate) and caustic soda or caustic potash, substantially as specified.

3. The herein-described process of treating gold ores, which consists in subjecting the ore in a closed vessel, to the conjoint action of steam heat and pressure, and of a solution containing sodium or potassium silicate and caustic soda or caustic potash caused to circulate through the ore substantially as specified.

CHARLES WETHERWAX.

In presence of—
 DAVID RANKIN STURROCK,
 ARCHIBALD PAUL DICKIE.